United States Patent
Christensen et al.

(10) Patent No.: US 9,385,368 B2
(45) Date of Patent: Jul. 5, 2016

(54) HIGH CAPACITY POSITIVE ELECTRODES FOR USE IN LITHIUM-ION ELECTROCHEMICAL CELLS AND METHODS OF MAKING SAME

(75) Inventors: Leif Christensen, St. Paul, MN (US); Jerome E. Scanlan, St. Paul, MN (US); Anthony P. Lindert, Oshkosh, WI (US)

(73) Assignee: 3M INNOVATIVE PROPERTIES COMPANY, St. Paul, MI (US)

( * ) Notice: Subject to any disclaimer, the term of this patent is extended or adjusted under 35 U.S.C. 154(b) by 189 days.

(21) Appl. No.: 14/241,304

(22) PCT Filed: Aug. 21, 2012

(86) PCT No.: PCT/US2012/051644
§ 371 (c)(1),
(2), (4) Date: Feb. 26, 2014

(87) PCT Pub. No.: WO2013/070298
PCT Pub. Date: May 16, 2013

(65) Prior Publication Data
US 2014/0234717 A1     Aug. 21, 2014

Related U.S. Application Data

(60) Provisional application No. 61/529,307, filed on Aug. 31, 2011.

(51) Int. Cl.
*H01M 4/36*     (2006.01)
*H01M 4/04*     (2006.01)
(Continued)

(52) U.S. Cl.
CPC .............. *H01M 4/366* (2013.01); *C01G 53/50* (2013.01); *H01M 4/0471* (2013.01);
(Continued)

(58) Field of Classification Search
CPC ..... H01M 4/366; H01M 4/525; H01M 4/505; H01M 4/0471
See application file for complete search history.

(56) References Cited

U.S. PATENT DOCUMENTS

| 6,071,645 A | 6/2000 | Biensan |
| 6,387,570 B1 | 5/2002 | Nakamura et al. |

(Continued)

FOREIGN PATENT DOCUMENTS

| EP | 1 742 281 | 1/2007 |
| JP | 2005-141983 | 6/2005 |

(Continued)

OTHER PUBLICATIONS

Chebiam, R.V. et al.; "Comparison of the chemical stability of the high energy density cathodes of lithium-ion batteries"; Electrochemistry Communications; vol. 3; 2001; pp. 624-627.

(Continued)

*Primary Examiner* — Stewart Fraser
(74) *Attorney, Agent, or Firm* — Adam Bramwell

(57) ABSTRACT

Positive electrode for lithium-ion electrochemical cells are provided that have capacity retentions of greater than about 95% after 50 charge-discharge cycles when comparing the capacity after cycle 52 with the capacity after cycle 2 when cycled between 2.5 V and 4.7 V vs. Li/Li$^+$ at 30° C. Compositions useful in the provided positive electrodes can have the formula, Li$_{1+x}$(Ni$_a$Mn$_b$Co$_c$)$_{1-x}$ O$_2$, wherein 0.05≤x≤0.10, a+b+c=1, 0.6≤b/a≤1.1, c/(a+b)<0.25, and a, b, and c are all greater than zero. The process of making these positive electrodes includes firing the compositions at 850° C. to 925° C.

8 Claims, 5 Drawing Sheets

(51) Int. Cl.
    *H01M 4/505*      (2010.01)
    *H01M 4/525*      (2010.01)
    *H01M 4/131*      (2010.01)
    *H01M 4/1391*     (2010.01)
    *H01M 10/0525*    (2010.01)
    *C01G 53/00*      (2006.01)

(52) U.S. Cl.
    CPC .......... *H01M 4/131* (2013.01); *H01M 4/1391* (2013.01); *H01M 4/505* (2013.01); *H01M 4/525* (2013.01); *H01M 10/0525* (2013.01); *C01P 2006/40* (2013.01); *Y02E 60/122* (2013.01); *Y02P 70/54* (2015.11)

(56) References Cited

U.S. PATENT DOCUMENTS

| | | | |
|---|---|---|---|
| 6,680,145 | B2 | 1/2004 | Obrovac et al. |
| 6,699,336 | B2 | 3/2004 | Turner et al. |
| 6,780,544 | B2 | 8/2004 | Noh |
| 7,498,100 | B2 | 3/2009 | Christensen et al. |
| 2002/0037456 | A1 | 3/2002 | Hosoya |
| 2002/0098416 | A1 | 7/2002 | Maeda |
| 2004/0058240 | A1 | 3/2004 | Christensen |
| 2007/0020522 | A1 | 1/2007 | Obrovac et al. |
| 2007/0020528 | A1 | 1/2007 | Obrovac et al. |
| 2007/0099087 | A1 | 5/2007 | Mihara et al. |
| 2007/0128517 | A1 | 6/2007 | Christensen et al. |
| 2007/0148544 | A1 | 6/2007 | Le |
| 2008/0280205 | A1* | 11/2008 | Jiang .................... C01G 53/006 429/223 |
| 2009/0239146 | A1 | 9/2009 | Nakagawa |
| 2009/0239148 | A1 | 9/2009 | Jiang |
| 2009/0286162 | A1 | 11/2009 | Lamanna et al. |
| 2010/0015516 | A1 | 1/2010 | Jiang |
| 2012/0244413 | A1 | 9/2012 | Shimano et al. |

FOREIGN PATENT DOCUMENTS

| | | |
|---|---|---|
| JP | 2005-336004 | 12/2005 |
| TW | I230482 | 4/2005 |
| WO | WO 2008/137241 | 11/2008 |
| WO | WO 2011/071094 | 6/2011 |

OTHER PUBLICATIONS

Kang, S. et al.; "Study of $Li_{1+x}(Mn_{4/9}Co_{1/9}Ni_{4/9})_{1-x}O_2$ Cathode Materials for Vehicle Battery Applications"; Journal of the Electrochemical Society; vol. 158, No. 8; 2011; pp. A936-A941 (XP002718878).

Kim, J.M. et al.; "Electrochemical Properties of $Li_{1+x}(Ni_{0.4}Co_{0.2}Mn_{0.4})_{1-x}O_2$ (x=0.00 and 0.05) for Lithium-ion Batteries"; ITE Letters on Batteries, New Technologies & Medicine; vol. 8, No. 5; 2007; pp. 530-534 (XP001516332).

Sun, Y. et al.; "High-energy cathode material for long-life and safe lithium batteries"; Nature Materials; vol. 8; 2009; pp. 320-324.

* cited by examiner

HIGH CAPACITY POSITIVE ELECTRODES FOR USE IN LITHIUM-ION ELECTROCHEMICAL CELLS AND METHODS OF MAKING SAME

FIELD

This disclosure relates to positive electrodes for use in lithium-ion electrochemical cells.

BACKGROUND

Secondary lithium-ion electrochemical cells typically include a positive electrode that contains lithium in the form of a lithium transition metal oxide, a negative electrode, a separator, and an electrolyte. Examples of transition metal oxides that have been used for positive electrodes include lithium cobalt dioxide and lithium nickel dioxide. Other exemplary lithium transition metal oxide materials that have been used for positive electrodes include mixtures of cobalt, nickel, and/or manganese oxides. Negative electrodes typically include graphite, lithium titanates, or alloys comprising electrochemically active elements such as Si, Sn, Al, Ga, Ge, In, Bi, Pb, Zn, Cd, Hg, and Sb.

The challenges in designing lithium-ion electrochemical cells include obtaining a balance between high capacity, high charge-discharge rates, low irreversible capacity, cost, and safety. Lithium cobalt oxide ($LiCoO_2$) is widely used as the positive electrode in lithium-ion electrochemical cells for use in commercial products such as computers and hand held phones. $LiCoO_2$ electrodes have high capacity due to the high density of $LiCoO_2$, rapid charge-discharge due to its layered structure, and low irreversible capacity. However, $LiCoO_2$ is expensive and subject to occasional runaway thermal reactions. To temper the expense and safety performance, manganese and nickel can be added to the oxide structure forming the so-called NMC (nickel, manganese, cobalt) oxides of lower cost and higher stability. However, the capacity of these oxides has not increased substantially over the capacity of $LiCoO_2$.

Typically, layered lithium transition metal oxides are never fully delithiated during cycling (charging) due to structural instability of the fully delithiated state. Thus, one way to achieve higher capacities is to design positive electrode materials that have increased stability at higher delithiation and, therefore, can be cycled to higher voltages (e.g., 4.3 to 4.8 V vs. $Li/Li^+$ or greater). Typical lithium mixed metal oxide (NMC) positive electrode materials, such as $Li[Ni_{0.42}Mn_{0.42}Co_{0.16}]O_2$, will cycle well up to a voltage charge of about 4.35 V to 4.4 V (vs. $Li/Li^+$). However, when such materials are charged beyond this value, e.g., to 4.8 V vs. $Li/Li^+$, the cycle life is quite poor.

SUMMARY

There is a need for positive electrode materials that are useful in lithium-ion electrochemical cells that can allow cycling to high voltages (e.g., 4.8 V vs. $Li/Li^+$) with little capacity fade from cycle to cycle. The provided positive electrode materials, electrodes made there from, and methods of making the same materials can allow high voltage cycling with little or reduced capacity fade from cycle to cycle compared to conventional materials.

In one aspect, a positive electrode for a lithium-ion electrochemical cell is provided that includes a composition having the formula, $Li_{1+x}(Ni_aMn_bCo_c)_{1-x}O_2$, wherein $0.05 \le x \le 0.10$, $a+b+c=1$, $0.6 \le b/a \le 1.1$, $c/(a+b)<0.25$, a, b, and c are all greater than zero and wherein said composition has a capacity retention of greater than about 95% after 50 cycles when comparing the capacity after cycle 52 with the capacity after cycle 2 when cycled between 2.5 V and 4.7 V vs. $Li/Li^+$ at 30° C. The composition can be prepared by firing precursors to a temperature ranging of from 850° C. to 925° C. The amount of cobalt can vary from about 10 to about 20 molar percent (based on total metal content) and the amount of manganese and nickel can be about the same (b/a is about 1). The amount of excess lithium can vary from 5 to 7% ($0.05 \le x \le 0.07$). Similar compositions can have greater than about 90% capacity retention after 52 cycles compared to the capacity after cycle 2 when cycled between 2.5 V and 4.7 V vs. $Li/Li^+$ at 50° C.

In another aspect, a positive electrode for a lithium-ion electrochemical cell is provided that includes a composition that comprises a plurality of particles having a core having the formula, $Li_{1-x}(Ni_aMn_bCo_c)_{1-x}O_2$, wherein $0.05 \le x \le 0.10$, $a+b+c=1$, $0.6 \le b/a \le 1.1$, $c/(a+b)<0.25$, a, b, and c are all greater than zero and a shell substantially surrounding the core, the shell comprising a lithium mixed transition metal oxide comprising manganese and nickel wherein the molar ratio of manganese to nickel is greater than 1, wherein said composition has a capacity retention of greater than about 95% after 52 cycles compared to the capacity after cycle 2 when cycled between 2.5 V and 4.7 V vs. $Li/Li^+$ at 30° C.

In yet another aspect, a method of making a positive electrode having the formula, $Li_{1+x}(Ni_aMn_bCo_c)_{1-x}O_2$, wherein $0.05 \le x \le 0.10$, $a+b+c=1$, $0.6 \le b/a \le 1.1$, $c/(a+b)<0.25$, a, b, and c are all greater than zero for a lithium-ion electrochemical cell is provided that includes first forming a mixed metal hydroxide or carbonate by precipitating an aqueous mixture of Ni:Mn:Co salts in a molar ratio of a:b:c with a hydroxide or carbonate source, drying the mixed metal hydroxide or carbonate, mixing the mixed metal hydroxide or carbonate with a Li source to provide a molar ratio of Li to transition metals of $[(1+x)/(1-x)]$ to 1, sintering the mixture at about 500° C. for at least about 4 hours, and firing the mixture at from about 850° C. to about 925° C. for at least 12 hours after sintering.

Finally, in another aspect, a method of making a positive electrode is provided that includes first forming a mixed metal hydroxide or carbonate by precipitating an aqueous mixture of Ni:Mn:Co salts with a hydroxide or carbonate source, where the molar ratio a:b:c is with respect to the formula, $Li_{1+x}(Ni_aMn_bCo_c)_{1-x}O_2$, wherein $0.05 \le x \le 0.10$, $a+b+c=1$, $0.6 \le b/a \le 1.1$, and $c/(a+b)<0.25$, a, b, and c are all greater than zero, drying the hydroxide or carbonate to form a dry transition metal hydroxide or carbonate powder, dispersing this powder in ammoniated water; as a seed dispersion, heating the mixture to about 60° C.; adding an aqueous solution of soluble mixed transition metal salts comprising manganese and nickel wherein the molar ratio of manganese to nickel is greater than 1, and precipitating a hydroxide or carbonate shell onto the core particles to form a core-shell hydroxide or carbonate; drying the core-shell hydroxide or carbonate; mixing the core-shell hydroxide or carbonate with a lithium source (e.g. LiOH, or $Li_2CO_3$ salt); sintering the mixture at about 500° C. for at least about 4 hours; and firing the mixture at from about 850° C. to about 925° C. for at least 12 hours after sintering.

In the present disclosure:

"cycling" refers to lithiation followed by delithiation or vice versa;

"negative electrode" refers to an electrode (often called an anode) where electrochemical oxidation and delithiation occurs during a discharging process; and "positive electrode" refers to an electrode (often called a cathode) where electrochemical reduction and lithiation occurs during a discharging process; and "substantially surrounding" refers to a shell that almost completely surrounds the core, but may have some imperfections which expose very small portions of the core.

The provided positive electrodes and electrochemical cell containing these positive electrodes can be operated at high voltages (greater than 4.4 V vs. Li/Li$^+$ and up to about 4.8 V vs. Li/Li$^+$) with higher retention of capacity after multiple cycles than conventional electrodes and cells.

The above summary is not intended to describe each disclosed embodiment of every implementation of the present invention. The brief description of the drawings and the detailed description which follows more particularly exemplify illustrative embodiments.

DETAILED DESCRIPTION

Figure 1:
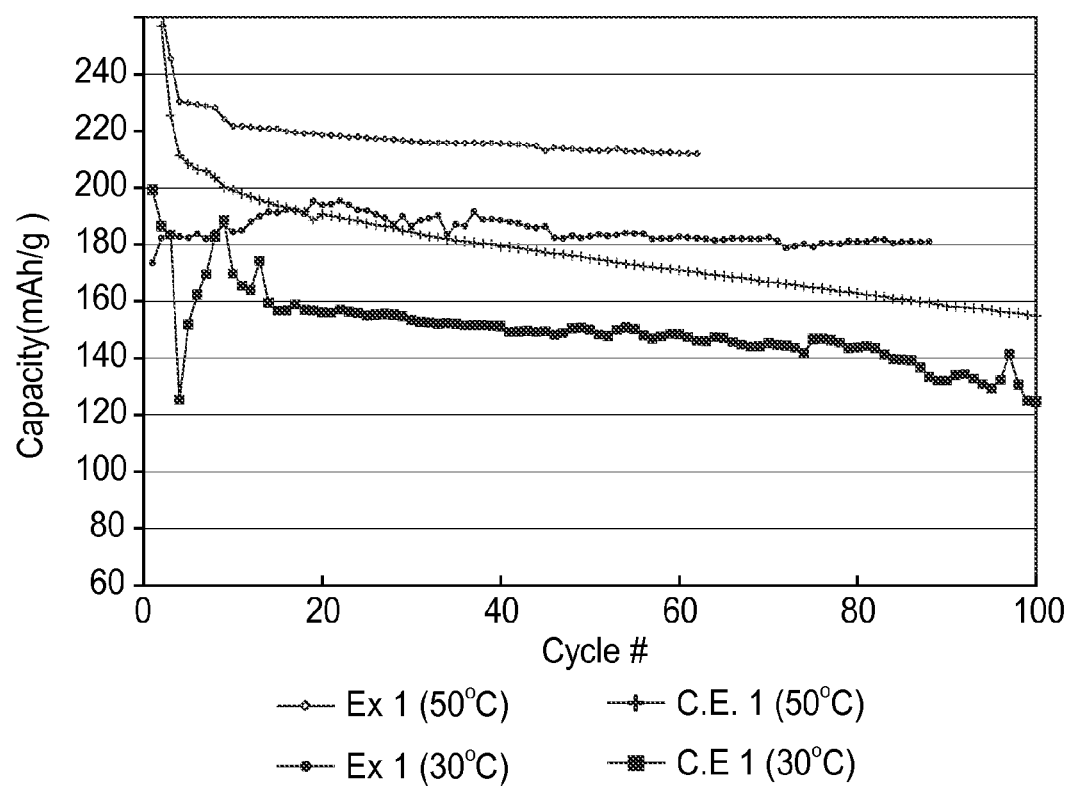
FIG. 1 is a comparative graph of capacity (mAh/g) vs. cycle number for the composition of Example 1 and a competitive material (commercial $Li_{1+x}(Mn_{0.42}Ni_{0.42}Co_{0.16})_{1-x}O_2$, (Commercial Material A with x=0.03-0.04) fired at 1000° C.) cycled at 30° C. and at 50° C.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Positive electrode materials have been developed for lithium-ion electrochemical cells that are less expensive and safer than LiCoO$_2$. Mixed lithium transition metal oxides that include nickel, manganese, and cobalt (NMC) are replacing lithium cobalt oxide increasingly in commercial batteries. For example, formulations such as $Li_{1+x}(Ni_{0.42}Mn_{0.42}Co_{0.16})_{1-x}$ O$_2$ (herein referred to as Commercial Material A), and $Li_{1+x}$ $[Ni_{1/3}Mn_{1/3}Co_{1/3})_{1-x}]O_2$ (hereinafter referred to as Commercial Material B) are available commercially (for example, from 3M Company, St. Paul, Minn.). These materials may have excess lithium of about 3-4 percent (x is about 0.03-0.04), can be fired at a high temperature (usually around 1000° C.) and are optimized for cycling in rechargeable cells in the range of 2.5 V to about 4.3 V vs. Li/Li$^+$. If these materials are charged to a high voltage, such as, for example, 4.8 V, they do not show strong signs of an oxygen loss plateau around 4.6 V and the capacity retention during cycling is low (about 25% capacity loss after about 50 cycles and almost complete loss of capacity retention after 150 cycles).

Kang et al. in "Study of $Li_{1+x}(Mn_{4/9}Co_{1/9}Ni_{4/9})_{1-x}O_2$ Cathode Materials for Vehicle Battery Applications", *J. Electrochemical Society*, 158 (8) A936-A941 (2011), describe a NMC type oxide cathode material $Li_{1+x}(Mn_{4/9}Co_{1/9} Ni_{4/9})_{1-x}O_2$ that similarly displays weak "oxygen loss" character, when initially cycled to 4.6 V. As with the above mentioned NMC type materials, the authors point out that their material cycles well between 2.5 V to 4.4 V but suffers considerable capacity loss with cycling when oxidized to higher voltages. Surprisingly, we have found that by slightly increasing the excess lithium, and by controlling the oxide firing temperature, NMC type oxides can be produced that have greatly improved cycle life performance when cycled to 4.7 V vs. Li/Li$^+$ not only at ambient temperature (30° C.) but also at elevated temperature (50° C.).

As is well known to those of ordinary skill in the art, lithium mixed metal oxide materials can exist in a layered O3 structure with alternating layers of transition metal oxide and lithium each layer having an oxygen layer in between. The O3 structure allows relatively facile removal and insertion of a fraction of the lithium without much change in structure over a voltage range from about 2.5 to 4.3V. Accordingly, the presence of an O3 layered structure enables the ability to charge, discharge, and recharge the material (by readily moving a fraction of lithium ions and electrons in and out of the lithium layer in the crystal structure) multiple times without much capacity loss. The average oxidation state of the transition metal layer is correspondingly raised or lowered.

Certain oxide compositions allow the incorporation of additional Li (excess Li) into the layered structure. This allows for the formation of a solid state solution of LiMO$_2$ and Li$_2$MnO$_3$. When such a virgin lithium mixed metal oxide material is first charged, lithium ions (and electrons) are removed from the layered structure. If the voltage is raised high enough and the transition metal layer has reach its highest oxidation state i.e., greater than about 4.6 V vs. Li/Li$^+$, electrons can still be forced to leave the layered structure at the irreversible expense of oxygen. At these higher voltages this is known as "oxygen loss". Commercial NMC materials do not show a strong oxygen loss character when taken to 4.8V, and if cycled above 4.4V display poor capacity retention.

Surprisingly, when some lithium mixed metal oxides (NMC oxides) have between 5 and 10 percent excess lithium and are prepared by firing at a narrow temperature range of 850° C. to 925° C., materials with improved cycling at high voltages can be produced. It has additionally been found that this improved performance is not universal, but composition dependent. NMC oxides only display this cycling improvement when the molar ratio of cobalt to the sum of the remaining transition metal is less than 25% and the molar ratio of Mn to Ni is between 1.1 to 0.6. Materials of the formula, $Li_{1+x}[(Ni_aMn_bCo_c)_{1-x}]O_2$, wherein a+b+c=1, b/c=0.6 to 1.1 and x=0.05 to 0.1 meet this requirement.

Positive electrodes for a lithium-ion electrochemical cell are provided that include a composition having the formula $Li_{1+x}(Ni_aMn_bCo_c)_{1-x}O_2$ wherein 0.05≤x≤0.10, a+b+c=1, 0.6≤b/a≤1.1, and c/(a+b)<0.25. Additionally, these electrodes are characterized in that the composition has a capacity retention of greater than about 95% after 50 cycles comparing the capacity after cycle 2 to the capacity after cycle 52 when cycled between 2.5 V and 4.7 V vs. $Li/Li^+$ at 30° C. In some embodiments, 0.10≤c≤0.20. In other embodiments, the ratio of b to a or b/a is about 1. In some embodiments, 0.05≤x≤0.07. In some embodiments, said composition has a capacity retention of greater than about 90% after 50 cycles comparing the capacity after cycle 2 to the capacity after cycle 52 when cycled between 2.5 V and 4.7 V vs. $Li/Li^+$ at 50° C.

In some embodiments, a positive electrode for a lithium-ion electrochemical cell comprising a composition that comprises a plurality of particles having a core and being substantially surrounded by a shell, the core having the formula, $Li_{1+x}(Ni_aMn_bCo_c)_{1-x}O_2$, wherein 0.05≤x≤0.10, a+b+c=1, 0.6≤b/a≤1.1, c/(a+b)<0.25, and the shell comprising a lithium mixed transition metal oxide comprising manganese and nickel wherein the molar ratio of manganese to nickel is greater than >1, wherein said composition has a capacity retention of greater than about 95% after 50 cycles recorded at the same rate cycled between 2.5 V and 4.7 V vs. $Li/Li^+$ at 30° C. Additionally, these electrodes are characterized in that the composition has a capacity retention of greater than about 95% after 50 cycles comparing the capacity after cycle 2 to the capacity after cycle 52 when cycled between 2.5 V and 4.7 V vs. $Li/Li^+$ at 30° C. In some embodiments, 0.10≤c≤0.20. In other embodiments, the ratio of b to a or b/a is about 1. In some embodiments, 0.05≤x≤0.07. In some embodiments, said composition has a capacity retention of greater than about 90% after 50 cycles recorded at the same rate cycled between 2.5 V and 4.7 V vs. $Li/Li^+$ at 50° C.

The provided positive electrodes can be incorporated into a lithium-ion electrochemical cell. The provided lithium-ion electrochemical cells may also include a negative electrode comprising carbon, graphite, titanates, alloys or mixtures of these. Useful alloy active materials include silicon, tin, or a combination thereof. Additionally the alloys include at least one transition metal. Suitable transition metals include, but are not limited to, titanium, vanadium, chromium, manganese, iron, cobalt, nickel, copper, zirconium, niobium, molybdenum, tungsten, and combinations thereof. The alloy active materials can also, optionally, include silver, lead, germanium, phosphorus, gallium, bismuth, aluminum, indium, carbon, or one or more of yttrium, a lanthanide element, an actinide element or combinations thereof. Suitable lanthanide elements include lanthanum, cerium, praseodymium, neodymium, promethium, samarium, europium, gadolinium, terbium, dysprosium, holmium, erbium, thulium, ytterbium, and lutetium. Suitable actinide elements include thorium, actinium, and protactinium. Some alloy compositions contain a lanthanide elements selected, for example, from cerium, lanthanum, praseodymium, neodymium, or a combination thereof.

Typical alloy active materials can include greater than 55 mole percent silicon. Useful alloy active materials can be selected from materials that have the following components, SiAlFeTiSnMm, SiFeSn, SiAlFe, SnCoC, and combinations thereof where "Mm" refers to a mischmetal that comprises lanthanide elements. Some mischmetals contain, for example, 45 to 60 weight percent cerium, 20 to 45 weight percent lanthanum, 1 to 10 weight percent praseodymium and, 1 to 25 weight percent neodymium. Other mischmetals contains 30 to 40 weight percent lanthanum, 60 to 70 weight percent cerium, less than 1 weight percent praseodymium, and less than 1 weight percent neodymium. Still other mischmetals contains 40 to 60 weight percent cerium and, 40 to 60 weight percent lanthanum. The mischmetal often includes small impurities (e.g., less than 1 weight percent, less than 0.5 weight percent, or less than 0.1 weight percent) such as, for example, iron, magnesium, silicon, molybdenum, zinc, calcium, copper, chromium, lead, titanium, manganese, carbon, sulfur, and phosphorous. The mischmetal often has a lanthanide content of at least 97 weight percent, at least 98 weight percent, or at least 99 weight percent. One exemplary mischmetal that is commercially available from Alfa Aesar, Ward Hill, Mass. with 99.9 weight percent purity contains approximately 50 weight percent cerium, 18 weight percent neodymium, 6 weight percent praseodymium, 22 weight percent lanthanum, and 3 weight percent other rare earths.

Exemplary active alloy materials include $Si_{60}Al_{14}Fe_8TiSn_7Mm_{10}$, $Si_{71}Fe_{25}Sn_4$, $Si_{57}Al_{28}Fe_{15}$, $Sn_{30}Co_{30}C_{40}$, or combinations thereof. The active alloy materials can be a mixture of an amorphous phase that includes silicon and a nanocrystalline phase that includes an intermetallic compound that comprises tin. Exemplary alloy active materials useful in the provided lithium-ion electrochemical cells can be found, for example, in U.S. Pat. No. 6,680,145 (Obrovac et al.), U.S. Pat. No. 6,699,336 (Turner et al.), and U.S. Pat. No. 7,498,100 (Christensen et al.) as well as in U.S. Pat. Publ. Nos. 2007/0148544 (Le), 2007/0128517 (Christensen et al.), 2007/0020522, and 2007/0020528 (both Obrovac et al.).

Provided electrochemical cells require an electrolyte. A variety of electrolytes can be employed. Representative electrolytes can contain one or more lithium salts and a charge-carrying medium in the form of a solid, liquid or gel. Exemplary lithium salts are stable in the electrochemical window and temperature range (e.g. from about −30° C. to about 70° C.) within which the cell electrodes can operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Exemplary solid electrolytes include polymeric media such as polyethylene oxide, fluorine-containing copolymers, polyacrylonitrile, combinations thereof and other solid media that will be familiar to those skilled in the art. Exemplary liquid electrolytes include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butyrolactone, methyl difluoroacetate, ethyl difluoroacetate, dimethoxyethane, diglyme (bis(2-methoxyethyl) ether), tetrahydrofuran, dioxolane, combinations thereof and other media that will be familiar to those skilled in the art. Exemplary electrolyte gels include those described in U.S. Pat. No. 6,387,570 (Nakamura et al.) and U.S. Pat. No. 6,780,544 (Noh).

The electrolyte can include other additives that will be familiar to those skilled in the art. For example, the electrolyte can contain a redox chemical shuttle such as those described in U.S. Pat. Appl. Publ. No. 2009/0286162 (Lamanna et al.).

Composite electrodes, such as the provided positive electrodes, can contain additives such as will be familiar to those skilled in the art. The electrode composition can include an electrically conductive diluent to facilitate electron transfer between the composite electrode particles and from the composite to a current collector. Electrically conductive diluents can include, but are not limited to, carbon black, metal, metal nitrides, metal carbides, metal silicides, and metal borides. Representative electrically conductive carbon diluents include carbon blacks such as SUPER P and SUPER S (both from MMM Carbon, Belgium), SHAWANIGAN BLACK (Chevron Chemical Co., Houston, Tex.), acetylene black, furnace black, lamp black, graphite, carbon fibers and combinations thereof.

The electrode composition can include an adhesion promoter that promotes adhesion of the composition and/or electrically conductive diluent to the binder. The combination of an adhesion promoter and binder can help the electrode composition better accommodate volume changes that can occur in the composition during repeated lithiation/delithiation cycles. Alternatively, the binders themselves can offer sufficiently good adhesion to metals and alloys so that addition of an adhesion promoter may not be needed. If used, an adhesion promoter can be made a part of the binder itself (e.g., in the form of an added functional group), can be a coating on the composite particles, can be added to the electrically conductive diluent, or can be a combination of such measures. Examples of adhesion promoters include silanes, titanates, and phosphonates as described in U.S. Pat. Appl. Publ. No. 2004/0058240 A1 (Christensen).

A method of making a positive electrode having the formula $Li_{1+x}(Ni_aMn_bCo_c)_{1-x}O_2$ is provided, wherein $0.05 \le x \le 0.10$, $a+b+c=1$, $0.6 \le b/a \le 1.1$, $c/(a+b)<0.25$ for a lithium-ion electrochemical cell comprising: combining first forming a mixed metal hydroxide or carbonate by precipitating an aqueous mixture of Ni:Mn:Co salts in a molar ratio of a:b:c with a hydroxide or carbonate source, drying the mixed metal hydroxide or carbonate, then mixing the mixed metal hydroxide or carbonate with a Li source to provide a molar ratio of Li to transition metals of $[(1+x)/(1-x)]$ to 1. Sintering the mixture at about 500° C. for at least about 4 hours; and firing the mixture at from about 850° C. to about 925° C. for at least 12 hours after sintering. In some embodiments, $0.10 \le c \le 0.20$. In other embodiments, the ratio of b to a or b/a is about 1. In some embodiments, $0.05<x \le 0.07$. In some embodiments, said composition has a capacity retention of greater than about 90% after 50 cycles comparing the capacity after cycle 52 to the capacity after cycle 2 when cycled between 2.5 V and 4.7 V vs. Li/Li$^+$ at 50° C.

Finally, a method of making a positive electrode is provided that includes first forming a mixed metal hydroxide or carbonate by precipitating an aqueous mixture of Ni:Mn:Co salts in a molar ratio of a:b:c with a hydroxide or carbonate source, drying the mixed metal hydroxide or carbonate, dispersing the powder in ammoniated water; heating the mixture to about 60° C.; adding an aqueous solution of soluble mixed transition metal salts comprising manganese and nickel wherein the molar ratio of manganese to nickel is greater than b/a and greater than 1 to the hydroxide or carbonate dispersion and precipitating with a hydroxide or carbonate source to form a core-shell hydroxide or carbonate; drying the core-shell hydroxide or carbonate; mixing the core-shell hydroxide or carbonate with a lithium salt to provide a Li to transition metal (combined core and shell) molar ratio of $[(1+x)/(1-x)]$ to 1; sintering the mixture at about 500° C. for at least about 4 hours; and firing the mixture at from about 850° C. to about 925° C. for at least 12 hours after sintering.

Objects and advantages of this invention are further illustrated by the following examples, but the particular materials and amounts thereof recited in these examples, as well as other conditions and details, should not be construed to unduly limit this invention.

EXAMPLES

Cycling Experiments

Positive electrode compositions were prepared by mixing the oxide, conductive diluent (Super P, MMM), and binder (PVDF, Aldrich Chemicals) in weight composition of (90:5:5) in MNP (Aldrich Chemicals) using a Mazerustar Mixer for 8 minutes. The suspension was coated onto Aluminum foil with a notch bar coater, and the coating dried in an oven at 100° C. The coating was cut into electrodes and assembled into 2325 coin cells using a metallic Li counter electrode. The cells were cycled using a Maccor Cycler (Maccor, Tulsa, Oklahoma) by charging and discharging between 2.5V and 4.8V vs. Li/Li$^+$ for the first two cycles at a charge and discharge rate of C/10, then between 2.5 and 4.7V for the following cycles, at a charge and discharge rate of C/4. The cells were held equilibrated in an oven at 30° C. or 50° C., the capacity retention over 50 cycles was determined by comparing the capacity after cycle 52 to the capacity after cycle 2.

Example 1

15 g of a mixed transition metal hydroxide of the composition $(Ni_{0.42}Mn_{0.42}Co_{0.16})(OH)_2$ (available from OMG, Kokkola, Finland) was mixed with 7.8 g Li(OH).H$_2$O in a mortar and the mixture sintered at 500° C. for 4 hrs, then fired at 900° C. for 12 hrs to form $Li_{1+x}[(Ni_{0.42}Mn_{0.42}Co_{0.16})_{1-x}]O_2$, with x=0.06.

FIG. 1 shows a graph of capacity (mAh/g) vs. cycle number for the composition of Example 1 compared to Commercial Material A. Commercial Material A is a lithium mixed metal oxide having the formula, $Li_{1+x}[(Ni_{0.42}Mn_{0.42}Co_{0.26})_{1-x}]O_2$, with x about 0.03-0.04. The cycling was done as described above at 30° C. and at 50° C. for both materials. The graph shows less capacity loss during cycling for Example 1 at both 30° C. and 50° C. compared to Commercial material A of similar transition metal composition. The composition of Example 1 has more excess lithium than Commercial Material A and was fired at a lower temperature than that of Commercial Material A. The results show that at both cycling temperatures, the slope of the change in capacity as a function of cycle number is less for the composition of Example 1 than for Commercial Material A.

Figure 2:
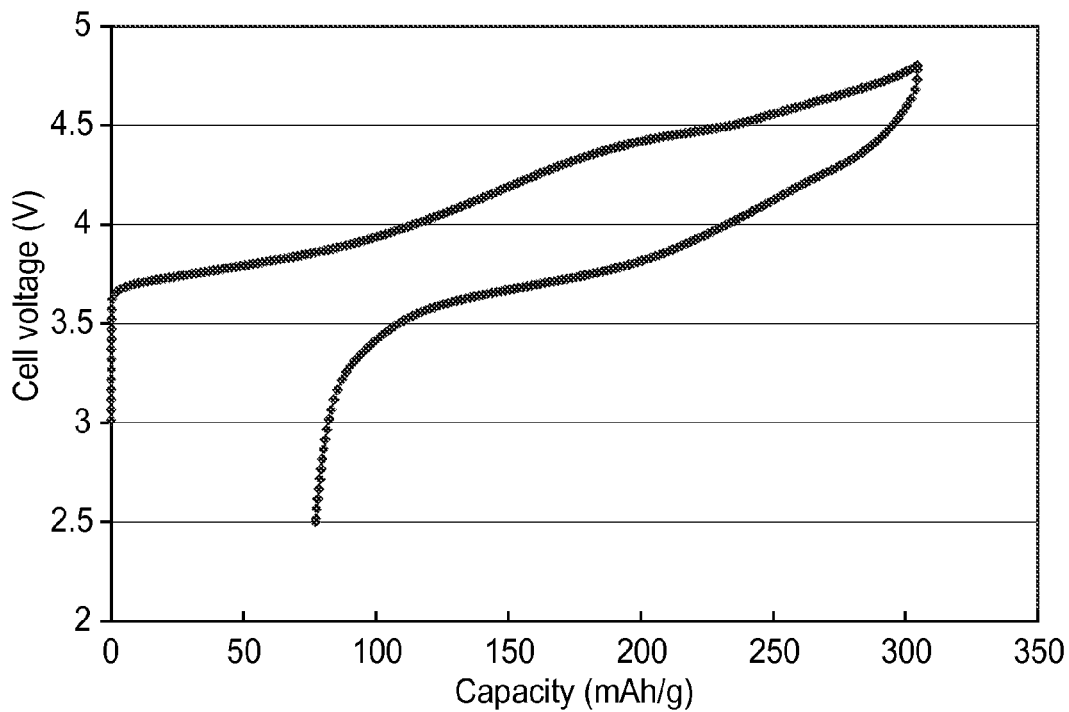
FIG. 2 is a graph of cell voltage (V) vs. capacity (mAh/g) for the composition of Example 1 cycled at 50° C.
Figure 2A:
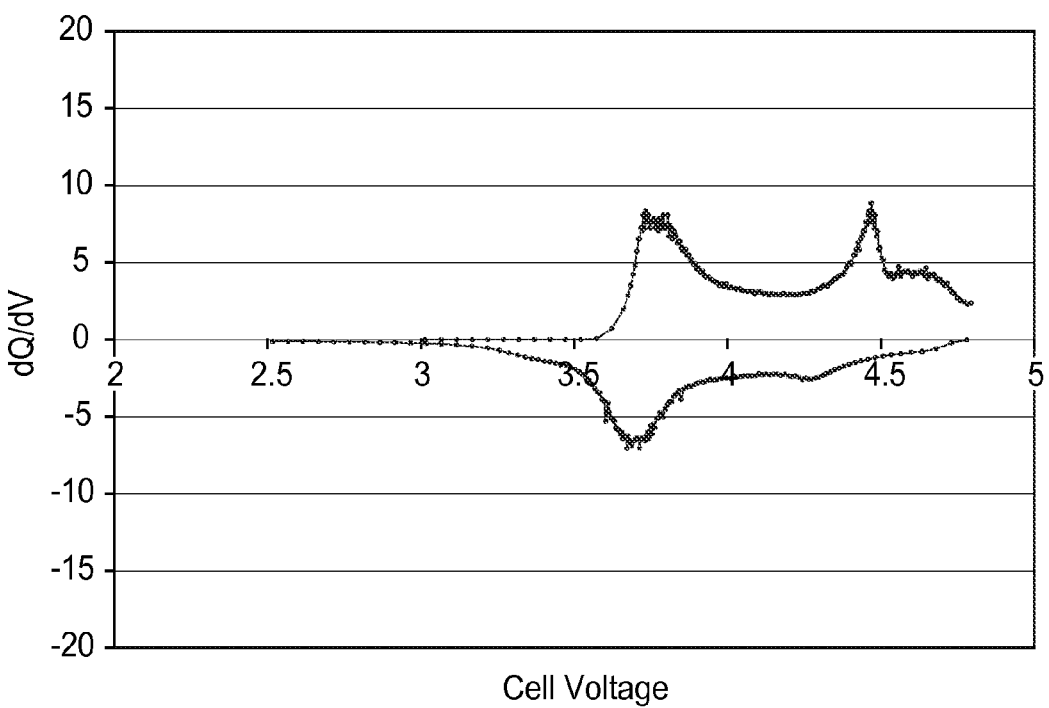
FIG. 2a is a graph of the differential capacity dQ/dV vs V for the voltage curve of FIG. 2.

FIG. 2 is a graph of cell voltage (V) vs. capacity (mAh/g) for the composition of Example 1. An "oxygen loss" plateau can be observed in FIG. 2 at around 4.5-4.7 volts. The existence of an "oxygen loss" plateau is particularly clear by observing the differential capacity plot (dQ/dV vs Q) showing a distinct peak at ~4.6 V (see FIG. 2a)

Figure 3:
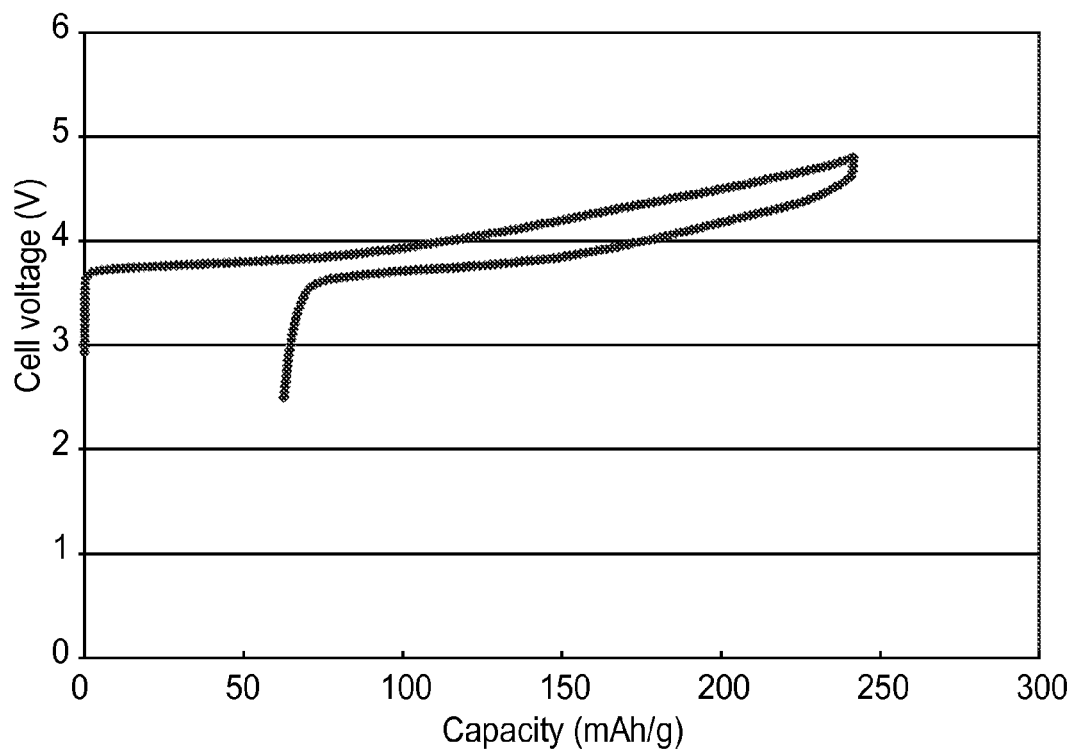
FIG. 3 is a graph of cell voltage (V) vs. capacity (mAh/g) for the composition of Comparative Example 1 cycled at 50° C.
Figure 3A:
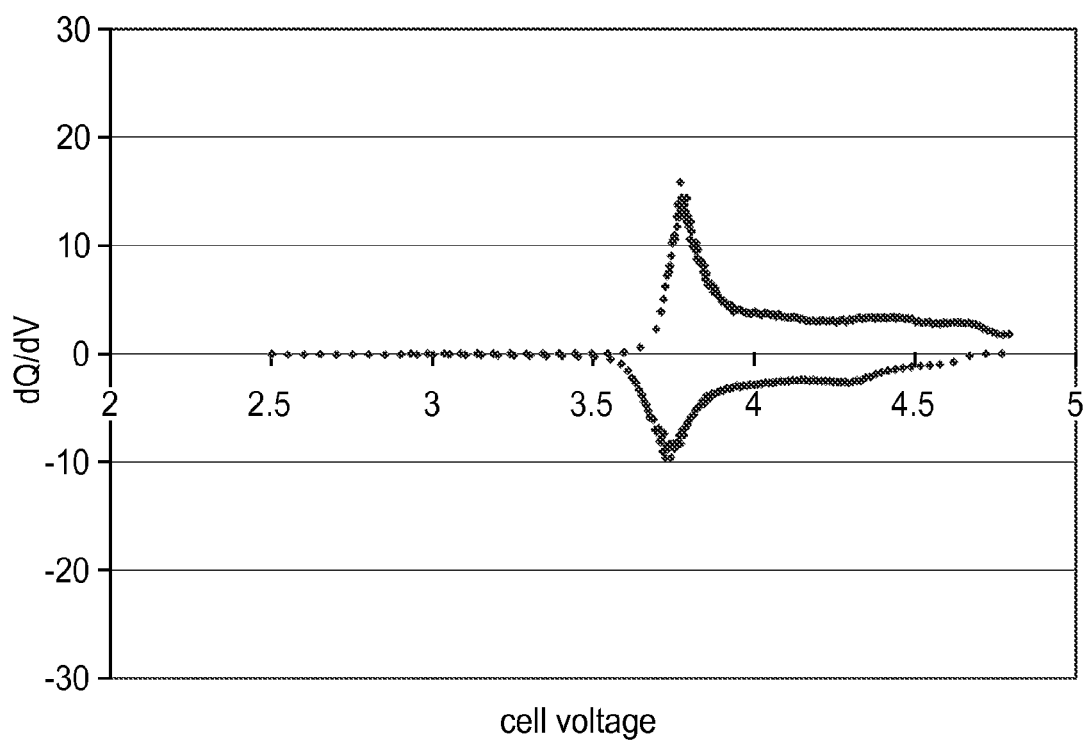
FIG. 3a is a graph of the differential capacity dQ/dV vs V for the voltage curve of FIG. 3.

FIG. 3 is a graph of cell voltage (V) vs. capacity (mAh/g) for Commercial Material A. This graph does not show much, if any, of an "oxygen loss" plateau (lack of peak around 4.6V in the dQ/dV vs Q plot (see FIG. 3a).

Example 2

The hydroxide $(Ni_{0.5}Mn_{0.4}Co_{0.1})(OH)_2$ was produced in a 500 mL stirred tank reactor equipped with temperature control, controlled stirrer speed, and pH probe control. A 2M solution of Ni(SO$_4$).H$_2$O, Mn(SO$_4$).H$_2$O, and Co(SO$_4$).H$_2$O with a molar ratio of 5:4:1 Ni:Mn:Co was metered into the reactor containing 75 mL of distilled water at a rate of 2-5 mL/min. During the reaction, the reactor pH was maintained at 9.9-10.0, the temperature was ambient and the solution was not deaerated. Addition of the sulfate solution continued till the maximum volume of the reactor was reached. The hydroxide was then washed and dried to form a transition metal hydroxide 15 g of this hydroxide was mixed with 7.8 g Li(OH).H$_2$O in a mortar and the mixture sintered at 500° C. for 4 hrs, then fired at 900° C. for 12 hrs to form a target composition of Li$_{1+x}$(Ni$_{0.5}$Mn$_{0.4}$Co$_{0.1}$)$_{1-x}$O$_2$ with x=0.06.

Comparative Example 1

In this example the oxide Li$_{1+x}$[(Ni$_{0.5}$Mn$_{0.4}$Co$_{0.1}$)$_{1-x}$]O$_2$ was produced with x=0.05 and fired at 1000° C.

6 g of the hydroxide described above was mixed with 3.04 g Li(OH).H$_2$O in a mortar and the mixture sintered at 500° C. for 4 hrs, then fired at 1000° C. for 12 hrs to form a target composition of Li$_{1+x}$(Ni$_{0.5}$Mn$_{0.4}$Co$_{0.1}$)$_{1-x}$O$_2$ with x=0.05.

Figure 4:
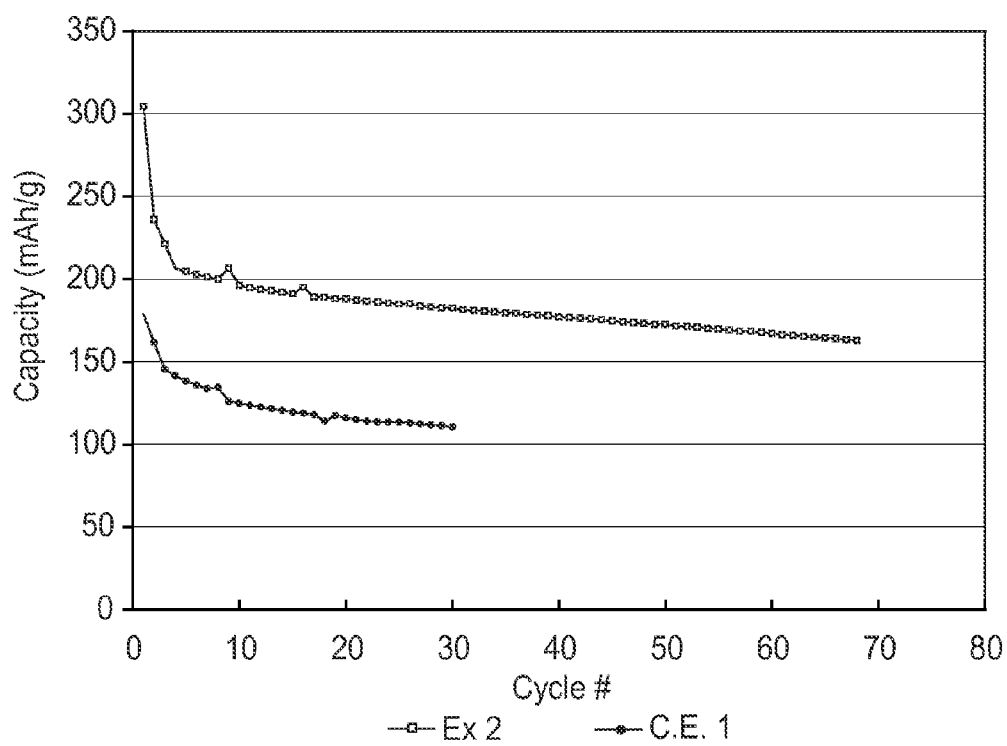
FIG. 4 is a comparative graph of capacity (mAh/g) vs. cycle number for compositions of Example 2 and Comparative Example 1 cycled at 50° C.

FIG. 4 is a comparative graph of capacity (mAh/g) vs. cycle number for compositions of Example 2 and Comparative Example 1. Both compositions have mixed metal oxides with 50% nickel, 40% manganese, and 10% cobalt. The composition of Comparative Example 1 has 5% excess lithium (x=0.05) and the composition of Example 2 has 6% excess lithium. FIG. 4 shows the difference in capacity as a function of cycling at 50° C. for the same compositions except that Example 2 has more excess lithium that Comparative Example 1 and the composition of Example 1 was fired at a temperature of 850° C. to 950° C. instead of 1000° C.

Comparative Example 2

In this example we compare commercial Li(Ni$_{1/3}$Mn$_{1/3}$Co$_{1/3}$)O$_2$ (BC-618, available from 3M company, St. Paul, Minn.) with Li$_{1+x}$[(Ni$_{1/3}$Mn$_{1/3}$Co$_{1/3}$)$_{1-x}$]O$_2$ prepared similar as in Example 1 with x=0.06 and firing at 900° C. No improvement in the cycling stability at 50° C. was observed between the two samples. This Example shows that there is a narrow composition range in which excess lithium and firing at 850° C. to 925° C. produces high voltage positive electrode materials.

Comparative Example 3 and Example 3

This example describes the synthesis of Li$_{1+x}$[(Ni$_{0.5}$Mn$_{0.3}$Co$_{0.2}$)$_{1-x}$]O$_2$ x=0.05 fired at 1000° C. (Comparative Example 3), and of Li$_{1+x}$[(Ni$_{0.5}$Mn$_{0.3}$Co$_{0.2}$)$_{1-x}$]O$_2$ x=0.06 fired at 900° C. (Example 3) following the procedures from Example 2 and Comparative Example 2. Samples from Comparative Example 3 and Example 3 were cycled vs. lithium as described above. The results are displayed cycling is illustrated in FIG. 5.

Figure 5:
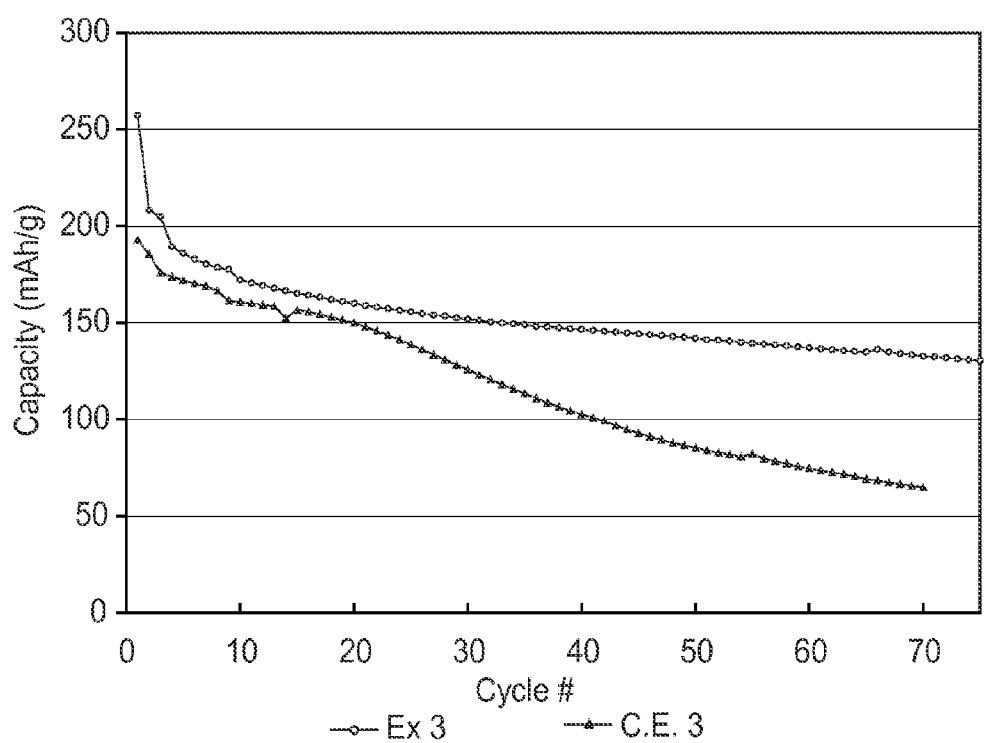
FIG. 5 is a comparative graph of capacity (mAh/g) vs. cycle number for compositions of Example 3 and Comparative Example 3 material cycled at 50° C.

FIG. 5 is a comparative graph of capacity (mAh/g) vs. cycle number for compositions of Comparative Example 3 and Example 3. These results show the importance of higher amounts of excess lithium and lower firing temperature on the performance of the positive electrode compositions at high voltages.

Comparative Example 4A and Comparative Example 4B

This example describes the synthesis according to Example 2 of Li$_{1+x}$[(Ni$_{0.17}$Mn$_{0.17}$Co$_{0.66}$)$_{1-x}$]O$_2$ x=0.05 fired at 1000° C. (Comparative Example 4A), and of Li$_{1+x}$[(Ni$_{0.17}$Mn$_{0.17}$Co$_{0.66}$)$_{1-x}$]O$_2$ x=0.06 fired at 900° C. (Comparative Example 4B). Samples from Comparative Examples 4A and 4B were cycled at 50° C. vs. lithium as described above. Both Comparative Examples 4A and 4B displayed poor cycling at 50° C. with less than 90% capacity retention after cycle 52 as compared with the capacity after cycle 2.

Figure 6:
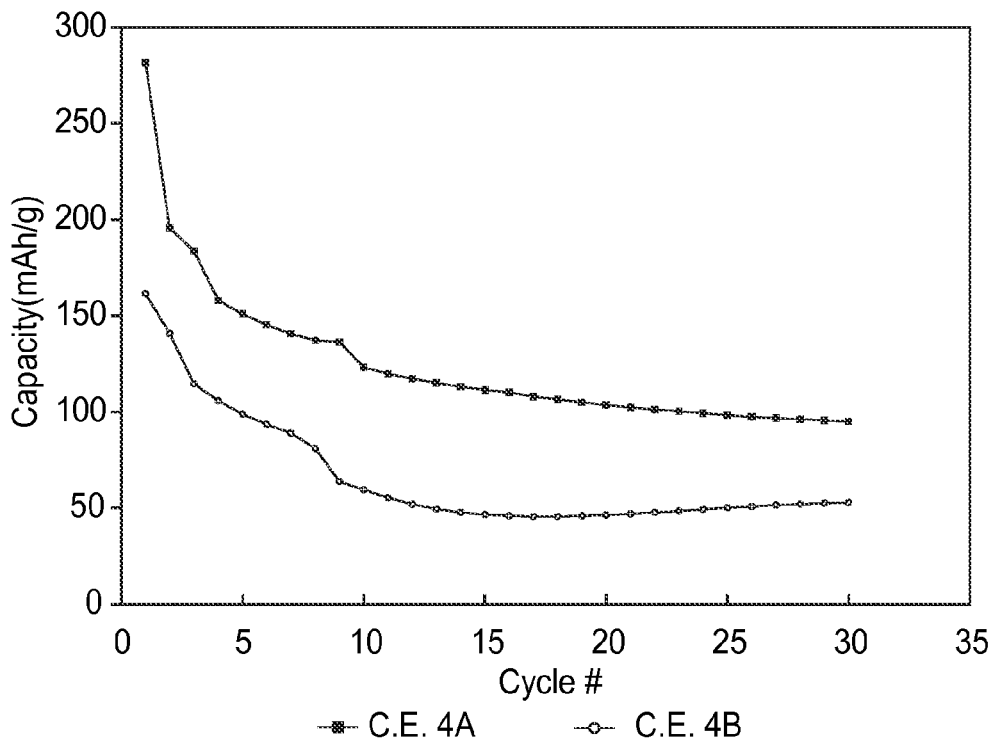
FIG. 6 is a comparative graph of capacity (mAh/g) vs. cycle number for compositions of Comparative Example 4 cycled at 50° C.

FIG. 6 is a comparative graph of capacity (mAh/g) vs. cycle number for compositions of Comparative Example 4A (fired at 1000° C.) and 4B (fired at 900° C.) cycled at 50° C. Comparative Example 4A and 4B do not meet the composition requirement of c/(a+b)<0.25, and both materials resulted in capacity retention of less than 90% over 50 cycles.

Comparative Example 5

This example describes the synthesis according to Example 2 of Li$_{1+x}$[(Ni$_{0.6}$Mn$_{0.3}$Co$_{0.1}$)$_{1-x}$]O$_2$ x=0.06 fired at 900° C. The precursor hydroxide could not be fired at 1000° C. with any meaningful results. The sample fired at 900° C. was observed to display an "oxygen loss" plateau. This comparative example shows that an "oxygen loss" plateau in the capacity vs. cell voltage curve is necessary but not sufficient for the production of stable high voltage positive electrodes. Comparative Example 5 does not meet the composition requirements of 0.6≤b/a≤1.2 and Comparative Example 5 displayed less than 90% capacity retention after 50 cycles.

Example 6

In a 10 L stirred tank reactor equipped with inlet and outlet ports, temperature control, controlled stirrer speed and pH probe control, was added 180 g of (Ni$_{0.42}$Mn$_{0.42}$Co$_{0.16}$)(OH)$_2$ (same as above) and 0.2M NH$_3$OH in 1.5 L deionized water. The dispersion was purged with argon under stirring and heated to 60° C. A 1.5M solution of Ni(SO$_4$).H$_2$O and Mn(SO$_4$).H$_2$O (Ni/Mn ratio 0.44/0.56) was metered into the dispersion at a rate of 3 ml/min for 5 hrs to form a core shell transition metal hydroxide. The amount of transition metal sulfate added was sufficient to form a 30% (atomic ratio) shell. The hydroxide was washed and dried to form a transition metal hydroxide powder with a shell composition of Ni:Mn (44:56 Atomic ratio).

15 g of this hydroxide was mixed with 7.8258 g Li(OH).H$_2$O in a mortar and the mixture sintered at 500° C. for 4 hrs, then fired at 900° C. for 12 hrs to form a target composition of Li$_{1+x}${[Ni$_{0.42}$Mn$_{0.42}$Co$_{0.16}$)$_{1-x}$]$_{0.07}$[Ni$_{0.44}$Mn$_{0.56}$)$_{1-x}$]$_{0.30}$}O$_2$, with x=0.06.

Figure 7:
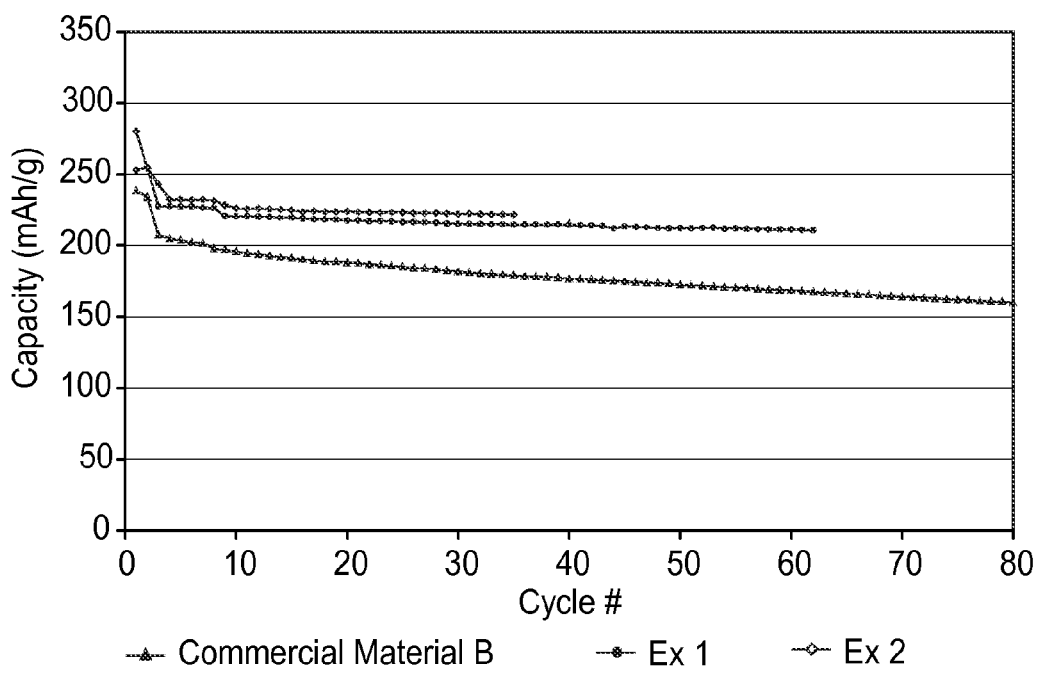
FIG. 7 is a graph of capacity (mAh/g) vs. cycle number for compositions of Example 1, Example 6, and commercial $Li_{1.05}[Ni_{0.42}Mn_{0.42}Co_{0.16}]O_2$ (Commercial Material A) cycled at 50° C.

FIG. 7 is a graph of capacity (mAh/g) vs. cycle number which illustrates the improved cycling at 50° C. of Example 6 compared to Example 1, and Commercial Material A (fired at 1000° C.) and cycled at 50° C. FIG. 7 demonstrates the added effect of providing a core shell composition.

Following are exemplary embodiments of high capacity positive electrodes for use in lithium-ion electrochemical cells and methods of making same according to aspects of the present invention.

Embodiment 1 is a positive electrode for a lithium-ion electrochemical cell comprising a composition having the formula,

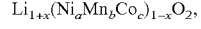

wherein 0.05≤x≤0.10, a+b+c=1, 0.6≤b/a≤1.1, c/(a+b)<0.25, and a, b, and c are all greater than zero, wherein said composition has a capacity retention of greater than about 95% after 50 cycles when comparing the capacity after cycle 52 with the capacity after cycle 2 when cycled between 2.5 V and 4.7 V vs. Li/Li$^+$ at 30° C.

Embodiment 2 is a positive electrode for a lithium-ion electrochemical cell according to embodiment 1, wherein 0.10≤c≤0.20.

Embodiment 3 is a positive electrode for a lithium-ion electrochemical cell according to embodiment 2, wherein b/a is about 1.

Embodiment 4 is a positive electrode for a lithium-ion electrochemical cell according to embodiment 1, wherein 0.05≤x≤0.07.

Embodiment 5 is a positive electrode for a lithium-ion electrochemical cell according to embodiment 1, wherein the composition has been prepared by heating to a temperature ranging from 850° C. to 925° C.

Embodiment 6 is a positive electrode for a lithium-ion electrochemical cell according to embodiment 1, wherein said composition has a capacity retention of greater than about 90% after 50 cycles after 50 cycles when comparing the capacity after cycle 52 with the capacity after cycle 2 when cycled between 2.5 V and 4.7 V vs. Li/Li+ at 50° C.

Embodiment 7 is a lithium-ion electrochemical cell comprising: an anode; an electrolyte; and a positive electrode according to embodiment 1.

Embodiment 8 is a positive electrode for a lithium-ion electrochemical cell comprising a composition that comprises a plurality of particles comprising: a core having the formula,

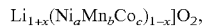

$$Li_{1+x}(Ni_aMn_bCo_c)_{1-x}O_2,$$

wherein 0.05≤x≤0.10, a+b+c=1, 0.6≤b/a≤1.1, c/(a+b)<0.25, a, b, and c are all greater than zero; and a shell substantially surrounding the core comprising a lithium mixed transition metal oxide comprising manganese and nickel wherein the molar ratio of manganese to nickel is greater than b/a and b/a>1, wherein said composition has a capacity retention of greater than about 95% after 50 cycles when comparing the capacity after cycle 52 with the capacity after cycle 2 when cycled between 2.5 V and 4.7 V vs. Li/Li$^+$ at 30° C.

Embodiment 9 is a positive electrode for a lithium-ion electrochemical cell according to embodiment 8, wherein the core has a formula wherein 0.10≤c≤0.20.

Embodiment 10 is a positive electrode for a lithium-ion electrochemical cell according to embodiment 8, wherein the core has a formula wherein 0.05≤x≤0.07.

Embodiment 11 is a positive electrode for a lithium-ion electrochemical cell according to embodiment 8, wherein the composition has been prepared by heating to a temperature ranging from 850° C. to 925° C.

Embodiment 12 is a positive electrode for a lithium-ion electrochemical cell according to embodiment 8, wherein said composition has a capacity retention of greater than about 90% after 50 cycles after 50 cycles when comparing the capacity after cycle 52 with the capacity after cycle 2 when cycled between 2.5 V and 4.7 V vs. Li/Li$^+$ at 50° C.

Embodiment 13 is a positive electrode for a lithium-ion electrochemical cell according to embodiment 8, wherein the core has a formula, $Li_{1.06}[Ni_{0.42}Mn_{0.42}Co_{0.16}]O_2$ and the shell has a ratio of b/a of 1.27.

Embodiment 14 is a lithium-ion electrochemical cell comprising: an anode; an electrolyte; and a positive electrode according to embodiment 8.

Embodiment 15 is a method of making a positive electrode having the formula,

$$Li_{1+x}(Ni_aMn_bCo_c)_{1-x}O_2,$$

wherein 0.05≤x≤0.10, a+b+c=1, 0.6≤b/a≤1.1, c/(a+b)<0.25 and a, b, and c are greater than zero comprising: precipitating a transition metal hydroxide or carbonate with a molar ratio of Ni:Mn:Co of a:b:c mixing said transition metal hydroxide or carbonate with a Li source in a molar ratio of Li to transition metal of [(1+x)/(1−x)] to 1; sintering the mixture at about 500° C. for at least about 4 hours; and firing the mixture at from about 850° C. to about 925° C. for at least 12 hours after sintering.

Embodiment 16 is a method of making a positive electrode according to embodiment 15, wherein 0.10≤c≤0.20.

Embodiment 17 is a method of making a positive electrode according to embodiment 15, wherein b/a is about 1.

Embodiment 18 is a method of making a positive electrode according to embodiment 15, wherein 0.05≤x≤0.07.

Embodiment 19 is a method of making a positive electrode according to embodiment 15, wherein said composition has a capacity retention of greater than about 90% after 50 cycles after 50 cycles when comparing the capacity after cycle 52 with the capacity after cycle 2 when cycled between 2.5 V and 4.7 V vs. Li/Li$^+$ at 50° C.

Embodiment 20 is a method of making a positive electrode comprising: precipitating a transition metal hydroxide or carbonate with a molar ratio of Ni:Mn:Co of a:b:c with respect to the formula

$$Li_{1+x}(Ni_aMn_bCo_c)_{1-x}O_2,$$

wherein 0.05≤x≤0.10, a+b+c=1, 0.6≤b/a≤1.1, c/(a+b)<0.25 and a, b, and c are all greater than zero to form a hydroxide mixture; dispersing the transition metal hydroxide or carbonate in ammoniated water; heating the mixture to greater than about 60° C.; adding an aqueous solution of soluble mixed transition metal salts comprising manganese and nickel wherein the molar ratio of manganese to nickel is greater >1 and precipitating to form a core-shell hydroxide or carbonate; drying the core-shell hydroxide or carbonate;

mixing the core-shell hydroxide or carbonate with a lithium salt;

sintering the mixture at about 500° C. for at least about 4 hours; and firing the mixture at from about 850° C. to about 925° C. for at least 12 hours after sintering.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A positive electrode for a lithium-ion electrochemical cell comprising a composition that comprises a plurality of particles comprising:

a core having the formula,

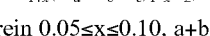

$$Li_{1+x}(Ni_aMn_bCo_c)_{1-x}O_2,$$

wherein 0.05≤x≤0.10, a+b+c=1, 0.6≤b/a≤1.1, c/(a+b)<0.25, a, b, and c are all greater than zero; and a shell substantially surrounding the core comprising a lithium mixed transition metal oxide comprising manganese and nickel wherein the molar ratio of manganese to nickel is greater than b/a and b/a>1, wherein said composition has a capacity retention of greater than about 95% after 50 cycles when comparing the capacity after cycle 52 with the capacity after cycle 2 when cycled between 2.5 V and 4.7 V vs. Li/Li$^+$ at 30° C.

2. A positive electrode for a lithium-ion electrochemical cell according to claim 1, wherein the core has a formula wherein $0.10 \leq c \leq 0.20$.

3. A positive electrode for a lithium-ion electrochemical cell according to claim 1, wherein the core has a formula wherein $0.05 \leq x \leq 0.07$.

4. A positive electrode for a lithium-ion electrochemical cell according to claim 1, wherein the composition has been prepared by heating to a temperature ranging from 850° C. to 925° C.

5. A positive electrode for a lithium-ion electrochemical cell according to claim 1, wherein said composition has a capacity retention of greater than about 90% after 50 cycles when comparing the capacity after cycle 52 with the capacity after cycle 2 when cycled between 2.5 V and 4.7 V vs. Li/Li$^+$ at 50° C.

6. A positive electrode for a lithium-ion electrochemical cell according to claim 1, wherein the core has a formula, $Li_{1.06}[Ni_{0.42}Mn_{0.42}Co_{0.16}]O_2$ and the shell has a ratio of b/a of 1.27.

7. A lithium-ion electrochemical cell comprising:
an anode;
an electrolyte; and
a positive electrode according to claim 1.

8. A method of making a positive electrode comprising:
first forming a mixed transition metal hydroxide or carbonate by precipitating an aqueous mixture of Ni:Mn:Co salts with a hydroxide or carbonate source, where the molar ratio a:b:c is with respect to the formula $$Li_{1+x}(Ni_aMn_bCo_c)_{1-x}O_2,$$

wherein $0.05 \leq x \leq 0.10$, $a+b+c=1$, $0.6 \leq b/a \leq 1.1$, $c/(a+b) < 0.25$ and a, b, and c are all
greater than zero to form a transition metal hydroxide or carbonate mixture;
dispersing the transition metal hydroxide or carbonate mixture in ammoniated water;
heating the transition metal hydroxide or carbonate mixture to greater than about 60° C.;
adding an aqueous solution of soluble mixed transition metal salts comprising manganese and nickel wherein the molar ratio of manganese to nickel is greater >1 and precipitating to form a core-shell hydroxide or carbonate;
drying the core-shell hydroxide or carbonate;
mixing the core-shell hydroxide or carbonate with a lithium salt;
sintering the core-shell hydroxide or carbonate mixture at about 500° C. for at least about 4 hours; and
firing the core-shell hydroxide or carbonate mixture from about 850° C. to about 925° C. for least 12 hours after sintering.

* * * * *